US008413970B2

(12) United States Patent
McIntosh

(10) Patent No.: US 8,413,970 B2
(45) Date of Patent: Apr. 9, 2013

(54) PIN CLAMP ASSEMBLY

(75) Inventor: Bruce D. McIntosh, Monroeville, IN (US)

(73) Assignee: PHD, Inc., Fort Wayne, IN (US)

( * ) Notice: Subject to any disclaimer, the term of this patent is extended or adjusted under 35 U.S.C. 154(b) by 1153 days.

(21) Appl. No.: 12/142,211

(22) Filed: Jun. 19, 2008

(65) Prior Publication Data

US 2008/0315478 A1 Dec. 25, 2008

Related U.S. Application Data

(60) Provisional application No. 60/945,017, filed on Jun. 19, 2007.

(51) Int. Cl.
*B23Q 1/00* (2006.01)

(52) U.S. Cl.
USPC ................................ 269/49; 269/93; 269/244

(58) Field of Classification Search .................... 269/49, 269/93, 244
See application file for complete search history.

(56) References Cited

U.S. PATENT DOCUMENTS 2,845,847 A 8/1958 Blatt et al.
3,273,878 A 9/1966 Blatt
3,362,703 A 1/1968 Blatt
3,371,923 A 3/1968 Blatt
3,436,072 A 4/1969 Svenson
3,442,291 A 5/1969 Carls
3,454,971 A 7/1969 Wolf
3,482,830 A 12/1969 Sendoykas
3,482,831 A 12/1969 Blatt
3,567,208 A 3/1971 Blatt
3,570,835 A 3/1971 McPherson
3,618,931 A 11/1971 Blatt
3,635,514 A 1/1972 Blatt
3,702,185 A 11/1972 Blatt
3,757,963 A 9/1973 Binkley
3,794,265 A 2/1974 Jantzen
(Continued)

FOREIGN PATENT DOCUMENTS

DE 4020981 A1 7/1990
DE 4030730 A1 9/1990
(Continued)

OTHER PUBLICATIONS

COMAU / PICO PC516 Pin Clamp Locator; Catalog Drawing Sht #1 as of Jan. 15, 2003.

(Continued)

*Primary Examiner* — Lee D Wilson
*Assistant Examiner* — Shantese McDonald
(74) *Attorney, Agent, or Firm* — Taylor IP, P.C.

(57) ABSTRACT

A pin clamp assembly having a body, a locating pin, an actuator, a drive rod, a cam, and a finger is provided. The locating pin is coupled to the body and movable between extended and retracted positions. The drive rod is movable relative to the locating pin. The cam is movable relative to the locating pin and the drive rod. The finger is coupled to the drive rod and movable between extended and retracted positions. Actuation of the actuator causes the drive rod to move which extends the finger without moving the locating pin. Also, continued retraction of the drive rod after the finger has extended causes the cam to move out from the slot in the body to allow the locating pin to retract.

18 Claims, 15 Drawing Sheets

U.S. PATENT DOCUMENTS

| | | | |
|---|---|---|---|
| 3,806,140 A | 4/1974 | Robertson | |
| 3,812,766 A | 5/1974 | Weiss | |
| 4,021,027 A | 5/1977 | Blatt | |
| 4,203,582 A | 5/1980 | Hart et al. | |
| 4,240,620 A | 12/1980 | Tünkers | |
| 4,396,183 A | 8/1983 | Lymburner | |
| 4,458,889 A | 7/1984 | McPherson et al. | |
| 4,494,739 A | 1/1985 | Valentine | |
| 4,496,138 A | 1/1985 | Blatt | |
| 4,564,151 A | 1/1986 | Pali | |
| 4,618,131 A | 10/1986 | Campisi et al. | |
| 4,620,696 A | 11/1986 | Blatt | |
| 4,723,767 A * | 2/1988 | McPherson et al. | 269/32 |
| 4,827,835 A | 5/1989 | LaBair | |
| 4,905,973 A | 3/1990 | Blatt | |
| 4,909,130 A | 3/1990 | LaBair | |
| 5,064,177 A | 11/1991 | Witt et al. | |
| 5,067,606 A | 11/1991 | Schlatter et al. | |
| 5,103,551 A | 4/1992 | Tamura et al. | |
| 5,125,632 A | 6/1992 | Blatt et al. | |
| 5,143,361 A | 9/1992 | McNamara et al. | |
| 5,147,091 A | 9/1992 | Yonezawa et al. | |
| 5,165,670 A | 11/1992 | Sawdon | |
| 5,171,001 A | 12/1992 | Sawdon | |
| 5,215,295 A | 6/1993 | Hoover | |
| 5,257,774 A | 11/1993 | Dykstra | |
| 5,271,651 A | 12/1993 | Blatt et al. | |
| 5,303,908 A | 4/1994 | Halder | |
| 5,350,163 A | 9/1994 | Lichtenberg | |
| 5,440,968 A | 8/1995 | Sekine | |
| 5,460,358 A | 10/1995 | Sendoykas | |
| 5,490,663 A | 2/1996 | Stojkovic et al. | |
| 5,575,462 A | 11/1996 | Blatt | |
| 5,634,629 A | 6/1997 | Blatt | |
| 5,657,972 A | 8/1997 | Blatt | |
| 5,676,357 A | 10/1997 | Horn | |
| 5,687,961 A | 11/1997 | Horn | |
| 5,697,752 A | 12/1997 | Dugas et al. | |
| 5,704,600 A | 1/1998 | Robinson | |
| 5,762,325 A | 6/1998 | Blatt | |
| 5,799,932 A | 9/1998 | Blatt | |
| 5,816,567 A | 10/1998 | Horn | |
| 5,823,519 A | 10/1998 | Tunkers | |
| 5,845,897 A | 12/1998 | Tunkers | |
| 5,845,898 A | 12/1998 | Halder et al. | |
| 5,853,211 A | 12/1998 | Sawdon et al. | |
| 5,871,250 A | 2/1999 | Sawdon | |
| 5,884,903 A | 3/1999 | Sawdon | |
| 5,938,257 A | 8/1999 | Blatt | |
| 5,996,984 A | 12/1999 | Takahashi | |
| 6,059,277 A | 5/2000 | Sawdon et al. | |
| 6,065,743 A | 5/2000 | Roudier et al. | |
| 6,070,864 A | 6/2000 | Crorey | |
| 6,076,816 A | 6/2000 | Tünkers | |
| 6,102,383 A | 8/2000 | Tünkers | |
| 6,105,947 A | 8/2000 | Dykstra | |
| 6,115,898 A | 9/2000 | Sawdon | |
| 6,129,345 A | 10/2000 | Chiorino | |
| 6,158,728 A | 12/2000 | Smith | |
| 6,186,517 B1 | 2/2001 | De Bruyn et al. | |
| 6,189,877 B1 | 2/2001 | Boris et al. | |
| 6,199,846 B1 | 3/2001 | Crorey | |
| 6,199,847 B1 | 3/2001 | Fukui | |
| 6,199,873 B1 | 3/2001 | Roudier et al. | |
| 6,206,353 B1 | 3/2001 | Becker et al. | |
| 6,220,588 B1 | 4/2001 | Tünkers | |
| 6,279,886 B1 | 8/2001 | Grossart | |
| 6,279,887 B1 | 8/2001 | Glasenapp et al. | |
| 6,338,476 B1 | 1/2002 | Takahashi | |
| 6,354,580 B1 | 3/2002 | Nagai et al. | |
| 6,357,735 B2 | 3/2002 | Haverinen | |
| 6,362,547 B1 | 3/2002 | Peterson et al. | |
| 6,364,300 B1 | 4/2002 | Kita | |
| 6,364,301 B1 | 4/2002 | Takahashi | |
| 6,364,302 B2 | 4/2002 | Ausilio | |
| 6,378,855 B1 | 4/2002 | Sawdon et al. | |
| 6,378,856 B1 | 4/2002 | Takahashi | |
| 6,416,045 B1 | 7/2002 | Morroney | |
| 6,422,549 B2 | 7/2002 | Crorey | |
| 6,435,494 B2 | 8/2002 | Takahashi et al. | |
| 6,439,560 B2 | 8/2002 | Sawada et al. | |
| 6,449,851 B1 | 9/2002 | Bone et al. | |
| 6,457,920 B1 | 10/2002 | Kleiner | |
| 6,471,199 B2 | 10/2002 | Nagai et al. | |
| 6,540,217 B2 | 4/2003 | Takahashi et al. | |
| 6,557,840 B2 | 5/2003 | Sawdon | |
| 6,557,841 B2 | 5/2003 | Dellach et al. | |
| 6,565,074 B1 | 5/2003 | Wheeler | |
| 6,585,246 B2 | 7/2003 | McCormick et al. | |
| 6,612,557 B2 | 9/2003 | Sawdon et al. | |
| 6,616,133 B1 | 9/2003 | Wheeler et al. | |
| 6,641,123 B2 | 11/2003 | Takahashi | |
| 6,644,638 B1 | 11/2003 | McCormick | |
| 6,648,316 B1 | 11/2003 | Vouland | |
| 6,648,317 B2 | 11/2003 | Takahashi | |
| 6,648,318 B1 | 11/2003 | Oetlinger et al. | |
| 6,655,673 B2 | 12/2003 | Colby | |
| 6,666,489 B2 | 12/2003 | Kruger | |
| 6,685,177 B2 | 2/2004 | Dugas et al. | |
| 6,695,359 B2 * | 2/2004 | Morel et al. | 269/49 |
| 6,698,736 B2 | 3/2004 | Dugas et al. | |
| 6,719,281 B2 | 4/2004 | Kohlert | |
| 6,727,194 B2 | 4/2004 | Yoo | |
| 6,733,271 B2 | 5/2004 | De Nichilo | |
| 6,736,385 B1 | 5/2004 | Beffrieu | |
| 6,739,587 B2 | 5/2004 | Migliori | |
| 6,786,478 B2 | 9/2004 | Pavlik et al. | |
| 6,814,349 B2 | 11/2004 | Migliori | |
| 6,845,975 B2 | 1/2005 | Tünkers | |
| 6,869,068 B2 | 3/2005 | Zhao et al. | |
| 6,877,730 B2 | 4/2005 | Sawdon et al. | |
| 6,880,816 B1 | 4/2005 | Wheeler et al. | |
| 6,883,795 B2 | 4/2005 | McCormick et al. | |
| 6,902,159 B2 | 6/2005 | Sawdon et al. | |
| 6,902,160 B1 | 6/2005 | Zajac, Jr. et al. | |
| 6,908,077 B2 | 6/2005 | Sawdon | |
| 6,913,254 B2 | 7/2005 | Pavlik et al. | |
| 6,931,980 B1 | 8/2005 | Zajac Jr. et al. | |
| 6,976,671 B2 | 12/2005 | Migliori | |
| 6,997,447 B2 | 2/2006 | Fukui | |
| 7,000,911 B2 | 2/2006 | McCormick et al. | |
| 7,007,938 B2 | 3/2006 | Nakata et al. | |
| 7,017,895 B2 | 3/2006 | Sakamoto | |
| 7,017,897 B2 | 3/2006 | Cheah | |
| 7,021,687 B2 | 4/2006 | Moilanen et al. | |
| 7,029,000 B2 | 4/2006 | Petit et al. | |
| 7,036,808 B2 | 5/2006 | Cheah | |
| 7,066,459 B2 | 6/2006 | Tunkers | |
| 7,182,326 B2 * | 2/2007 | McIntosh et al. | 269/32 |
| 7,448,607 B2 | 11/2008 | Steele et al. | |
| 7,467,788 B2 | 12/2008 | McIntosh et al. | |
| 7,516,948 B2 | 4/2009 | McIntosh et al. | |
| 8,132,798 B2 | 3/2012 | McIntosh et al. | |
| 8,132,799 B2 | 3/2012 | McIntosh et al. | |
| 2002/0093131 A1 | 7/2002 | Dugas et al. | |
| 2002/0100155 A1 | 8/2002 | Nakamura | |
| 2004/0021260 A1 | 2/2004 | Migliori | |
| 2004/0041323 A1 | 3/2004 | Migliori | |
| 2004/0070130 A1 | 4/2004 | Pavlik et al. | |
| 2004/0159996 A1 | 8/2004 | Migliori | |
| 2004/0195747 A1 | 10/2004 | Migliori | |
| 2004/0195750 A1 | 10/2004 | Migliori | |
| 2004/0195751 A1 | 10/2004 | Migliori | |
| 2004/0195752 A1 | 10/2004 | Migliori | |
| 2005/0012258 A1 | 1/2005 | Migliori | |
| 2005/0017423 A1 | 1/2005 | Kita et al. | |
| 2005/0035515 A1 | 2/2005 | Hixon, Jr. et al. | |
| 2005/0035516 A1 | 2/2005 | Sawdon et al. | |
| 2005/0051939 A1 | 3/2005 | Beffrieu | |
| 2005/0121843 A1 | 6/2005 | Maffeis | |
| 2005/0225017 A1 | 10/2005 | Sakamoto | |
| 2005/0230893 A1 | 10/2005 | Zajac, Jr. et al. | |
| 2005/0242483 A1 | 11/2005 | McIntosh et al. | |
| 2005/0269755 A1 | 12/2005 | Zhao et al. | |
| 2006/0049565 A1 | 3/2006 | Petit et al. | |
| 2006/0103063 A1 | 5/2006 | Liu et al. | |
| 2006/0125167 A1 | 6/2006 | Steele et al. | |

| | | | | |
|---|---|---|---|---|
| 2006/0163790 | A1 | 7/2006 | Xu et al. | |
| 2007/0042632 | A1 | 2/2007 | Patwardhan et al. | |
| 2007/0069439 | A1 * | 3/2007 | McIntosh et al. | 269/32 |
| 2007/0267795 | A1 | 11/2007 | Patwardhan et al. | |
| 2008/0315477 | A1 | 12/2008 | Alexander et al. | |
| 2008/0315478 | A1 | 12/2008 | McIntosh | |
| 2009/0096146 | A1 | 4/2009 | Steele et al. | |
| 2009/0315236 | A1 | 12/2009 | McIntosh | |

FOREIGN PATENT DOCUMENTS

| | | | |
|---|---|---|---|
| DE | 10004506 | C1 | 2/2000 |
| EP | 0 256 208 | | 2/1988 |
| EP | 0322617 | A2 | 7/1989 |
| EP | 0 894 572 | | 2/1999 |
| FR | 2755049 | A1 | 4/1998 |
| FR | 2837118 | A1 | 9/2003 |
| JP | 01193135 | A | 8/1989 |
| JP | 404143182 | A | 5/1992 |
| JP | 407328973 | A | 12/1995 |
| JP | 09192968 | | 7/1997 |
| JP | 2001105379 | | 4/2001 |
| SU | 1593956 | A1 | 9/1990 |
| WO | WO 9635547 | A1 | 11/1996 |
| WO | WO 03/041913 | A1 | 5/2003 |

OTHER PUBLICATIONS

Internal Mechanism of Pin Clamp Locator.
International Search Report; Sep. 4, 2007.
International Search Report; Oct. 11, 2007.
PCT International Search Report; Sep. 29, 2008.
PCT International Search Report; Apr. 15, 2008.
Extended European Search Report; May 6, 2008 (mailed May 20, 2008).

* cited by examiner

PIN CLAMP ASSEMBLY

RELATED APPLICATIONS

The present application is related to and claims priority to U.S. Provisional Patent Application Ser. No. 60/945,017, filed on Jun. 19, 2007, entitled Pin Clamp Assembly. The subject matter disclosed in that provisional application is hereby expressly incorporated into the present application.

TECHNICAL FIELD

The present disclosure is directed to pin clamp assemblies and, in particular, locating pin clamp assemblies that include a locating pin configured to extend through an opening in a workpiece, extend a finger, and clamp onto and hold the workpiece.

BACKGROUND AND SUMMARY

Typically, a pin clamp assembly includes a locating pin extending from a body that inserts into a hole on a workpiece. A finger extends from the locating pin while clamping onto the workpiece holding it in place. Pin clamps with moveable locating pins employ the movement of the locating pin to extend the finger. In other words, movement of the locating pin moves the finger. While this can create a certain level of efficiency by employing movement of one structure to move another, it can serve as a drawback as well. Employing movement of the locating pin to cause movement of the finger may be an efficient design from the perspective of mechanics, but not necessarily from the perspective of the assembly line. In order to extend and retract the finger, the locating pin is required to travel a relatively substantial distance. This extended travel increases the amount of room needed to perform an operation, since the locating pin has to move for the finger to extend and then clamp down on the workpiece. It also increases the amount of time required to perform the operation.

It would, therefore, be beneficial to provide a pin clamp assembly that can have an extendable finger and locating pin to clamp down on a workpiece, but does not require the relatively substantial time and travel of conventional pin clamp assemblies.

An embodiment of the present disclosure provides a pin clamp assembly that comprises a body, a locating pin, an actuator, a drive rod, a cam, and a finger. The locating pin is coupled to the body and movable between extended and retracted positions. The drive rod is movable relative to the locating pin. The cam is movable relative to the locating pin and the drive rod. The finger is coupled to the drive rod and is movable between extended and fully retracted positions. Actuation of the actuator causes the drive rod to move which extends the finger without moving the locating pin. Also, continued retraction of the drive rod after the finger has extended causes the cam to move out from the slot in the body to allow the locating pin to retract.

In the above and other embodiments, the pin clamp assembly may also comprise: the drive rod being linearly movable relative to the locating pin; a pin disposed in the cam slot located in the cam and through the drive rod; the cam being located in the locating pin and the body; and the body including a slot configured to receive the cam to selectively prevent the locating pin from moving when the finger is extending.

Another illustrative embodiment of a pin clamp assembly also comprises a body, a locating pin, an actuator, a drive rod, a cam, and a finger. The embodiment also includes a piston rod and a pin. The locating pin is movably coupled to the body between extended and retracted positions. The piston rod is attached to the actuator and is linearly movable upon activation of the actuator. The cam is located in the locating pin and the body. The cam also has a cam slot disposed therein. The drive rod is located in, and movable relative to, the locating pin. The pin is disposed in the cam slot and through the drive rod. The finger is coupled to the drive rod and movable between extended and fully retracted positions. Actuation of the actuator causes the drive rod and cam to move extending the finger without moving the locating pin. A slot is located in the body configured to receive the cam to selectively prevent the locating pin from moving when the finger is moving to the extended position. As the piston rod retracts, it pulls on the drive rod coupled to the finger causing the finger to extend from the locating pin. Continued retraction of the drive rod after the finger has extended causes the cam to move out from the slot in the body to allow the locating pin to retract.

Another illustrative embodiment of a pin clamp assembly also comprises a body, a locating pin, an actuator, a drive rod, a cam, and a finger. This embodiment further includes a locking bracket assembly. The locating pin is movably coupled to the body between extended and retracted positions. The drive rod is movable relative to the locating pin. The cam is also movable relative to the locating pin and the drive rod. The finger is coupled to the drive rod and movable between extended and fully retracted positions. Actuation of the actuator causes the drive rod to move which extends the finger without moving the locating pin. Continued retraction of the drive rod after the finger has extended causes the cam to move out from the slot in the body to allow the locating pin to retract. The locking bracket assembly comprises a pivoting locking arm that is biased to cause rotation of that arm as the locating pin retracts. The locking arm engages a first stop member to limit the amount of rotation of the locking arm. A second stop member engages the locking arm limiting movement of the locating pin.

In the above and other embodiments, the pin clamp assembly may also comprise: the second stop member being a set screw that allows limited movement of the locating pin; the second set screw allowing or prohibiting extension of the locating pin; a release member that engages a portion of the locking bracket assembly to release it from prohibiting movement of the locating pin; the release member being attached to the piston rod; to extend the locating pin the release member moves and engages the locking bracket against the bias which rotates the locking arm away from the second stop member; the release member being disposed through a slot in the drive rod to allow movement of the release member prior to engagement of the drive rod; after the piston rod and release member move the locking assembly, the drive rod and locating pin extend; the locking arm is biased by a spring; and a sensor assembly comprising a sensor attached to the pin clamp assembly in a position proximate to the ram which includes a sensor target.

Another illustrative embodiment of a pin clamp assembly also comprises a finger that selectively extends from a locating pin independently from any movement of the locating pin. In addition, the locating pin retracts only after the locating pin is extended.

Additional features and advantages of the pin clamp assembly will become apparent to those skilled in the art upon consideration of the following detailed description of the illustrated embodiment exemplifying the best mode of carrying out the pin clamp assembly as presently perceived.

BRIEF DESCRIPTION OF DRAWINGS

The present disclosure will be described hereafter with reference to the attached drawings which are given as non-limiting examples only, in which.

Corresponding reference characters indicate corresponding parts throughout the several views. The exemplification set out herein illustrates embodiments of the pin clamp assembly, and such exemplification is not to be construed as limiting the scope of the pin clamp assembly in any manner.

DETAILED DESCRIPTION OF THE DRAWINGS

Figure 1:
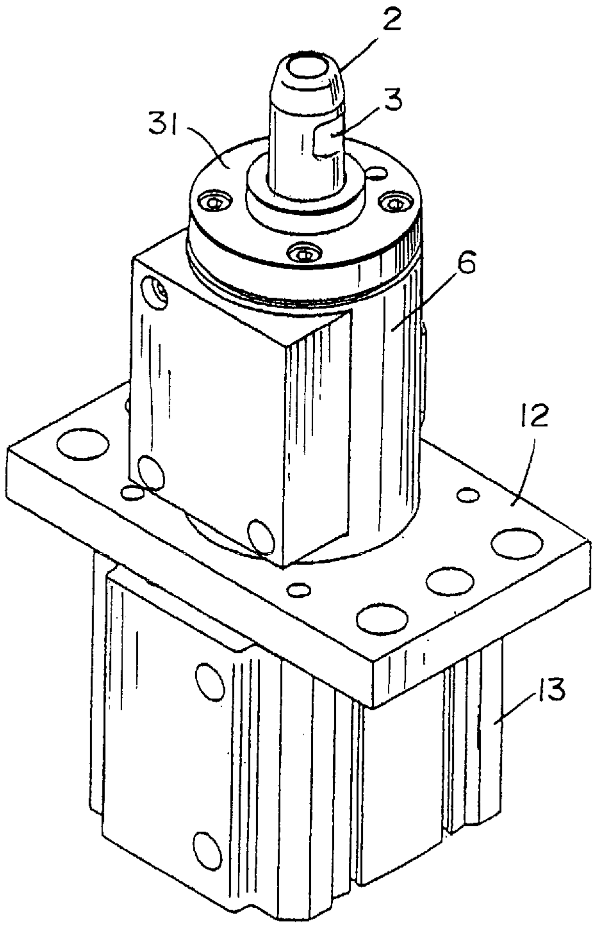
FIG. 1 is a perspective view of an illustrative embodiment of a locating pin clamp assembly.

An illustrative embodiment of the present disclosure includes a pin clamp assembly that has a locating pin extending from a body. While the locating pin is in the extended position, an actuator, such as a pneumatic or other fluid actuator, activates and causes the finger to extend prior to retraction of the locating pin. This allows the locating pin to have a shorter stroke reducing the distance the panel needs to travel down over the locating pin prior to clamping, since movement of the finger to the retracted or extended position does not depend on, or is accomplished in response to movement of the locating pin. Movement of the finger to either the extended or retracted position is accomplished prior to or after any movement of the locating pin. It is appreciated that in certain embodiments, because of the independent movement of the finger with respect to the locating pin, the pin clamp assembly can be configured so the finger extends or retracts at any desired position along the stroke of the locating pin.

In an illustrative embodiment, a piston rod moves linearly when the actuator is activated. When the locating pin and the piston rod are in the extended position and are ready to retract, a cam is positioned in a slot formed in the locating pin and in a portion of the housing. The cam located in this housing slot prevents the locating pin from moving between extended and retracted positions. Thus, as the piston rod moves downward, it pulls on a drive rod that is coupled to the fingers via an illustrative tongue-and-groove or pin-and-slot configuration causing the finger to extend from the locating pin. As the drive rod retracts, it causes the cam (because of the configuration of the cam slot) to begin moving out from the housing slot. At this point, however, the cam is still partially located in the slot, preventing the locating pin from retracting. Further retraction of the piston rod and drive rod causes the cam to further shift and move out of the housing slot. Once the cam has moved out of the housing slot, the cam pulls on the locating pin to retract it as well. As this occurs, the finger is already in the extended position. This sequence of movements allows the actual retraction to be very slight. Thus, there is no requirement that the locating pin retracts in order to move or extend the finger. The extension of the finger happens before any movement of the locating pin. This advantageously allows a shorter stroke of the locating pin to hold or release the workpiece.

Illustratively, the locating pin clamp assembly may also include a locking bracket assembly. The locking bracket assembly illustratively includes a pivoting locking arm that is biased by a spring to cause rotation of that arm as the locating pin retracts. The continued bias by the spring on the locking arm continues to rotate the same until it reaches a desired position. A second arm on the lock assembly engages a stop to limit the amount of rotation of the lock arm. A set screw or other stop member can be located adjacent the locking arm when it is in the final position to prevent the locating pin from extending. It is appreciated that in an illustrative embodiment, the set screw is adjustable to allow or prohibit a particular amount of backing up or extending of the locating pin. For example, the set screw can be set so when it is located adjacent the locking arm, the locating pin cannot extend at all while in the retracted position. Or, the set screw can also be backed up a slight distance from that locking arm so that the locating pin can be backed up a slight distance if desired.

In order to release the lock assembly, a pin or equivalent structure can be attached to the piston rod. When the extension sequence is initiated, the pin may engage the stop arm and, against the bias of the spring, rotate the locking arm out of position adjacent the lock or set screw. That pin can also be located in a slot in the drive rod so that there is free movement of the piston rod and pin prior to engagement with the drive rod. Therefore, after the piston rod and pin move the lock assembly, they then proceed to move the drive rod and locating pin upward toward the extended position. As this happens, the cam is being pushed in a direction toward the slot in the housing. Also, the lock assembly is continuing to move against the bias of the spring so it does not lock the assembly. As the locating pin extends further, the cam engages the slot in the housing, preventing the locating pin from extending further (i.e., the locating pin is now in the extended position), but does not prevent the drive rod from continuing to extend. Further extension of the drive rod causes the finger to retract.

In another illustrative embodiment, a sensor assembly can be used that includes a sensor attached to the assembly in a position proximate to the stop arm of the lock assembly. In this case, the sensor can detect when the stop arm stops the lock assembly from rotating which indicates that the locating pin and finger are in the retracted and extended positions, respectively. Conversely, another sensor may be located proximate to the locking arm so when it is located away from the lock or set screw (i.e., in the unlocked position), the sensor can detect that at least the locating pin is in the extended position.

Referring now to the drawings, a perspective view of locating pin clamp assembly 1 is shown in FIG. 1. This, illustrative embodiment includes a locating pin 2 extending from main housing 6 which is attached to a cylinder actuator 13 (illustratively pneumatic) through a mounting flange 12. Locating pin 2, upon activation of actuator 13, is extendable and retractable to and from housing 6. A finger 3 is located adjacent the distal end of locating pin 2 and is movable relative thereto between extended and retracted positions. A part support 31 is illustratively attachable to housing 6 and provides the surface upon which a workpiece can sit and be held by finger 3. It is appreciated that in other illustrative embodiments, the clamp assembly may include a plurality of fingers that extend and retract to engage a workpiece.

Figure 2:
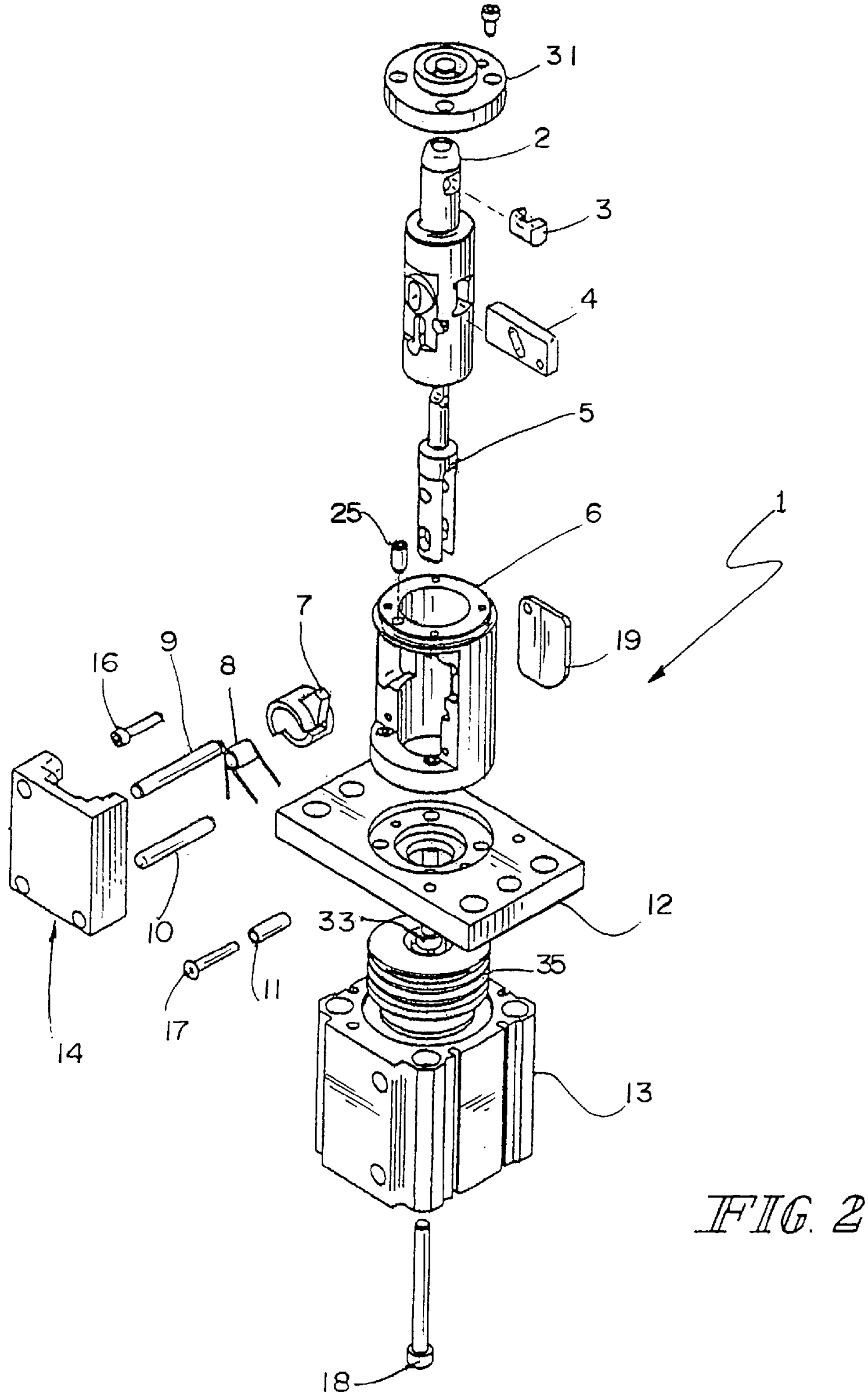
FIG. 2 is an exploded view of the locating pin clamp assembly shown in FIG. 1.

An exploded view of locating pin clamp 1 is shown in FIG. 2. As shown in this illustrative embodiment, part support 31 has a bore disposed therethrough that receives locating pin 2. Illustrative bores are disposed through part support 31 to attach it to housing 6. Locating pin 2 includes a slot adjacent the distal end configured to receive finger 3. Another slot is disposed through locating pin 2 to receive cam 4. Locating pin 2 illustratively includes yet another bore disposed therein to receive drive rod 5 which is configured to engage both finger 3 and cam 4. Housing 6 has a bore disposed therein that receives locating pin 2, cam 4, and drive rod 5. Housing 6 includes slots that receive portions of cam 4. In this illustrative embodiment, locating pin 2, cam 4, and drive rod 5 are located in the bore of housing 6 and are held therein by part support 31. A cover 19 can be fastened to an auxiliary opening in housing 6 to selectively allow access to portions of its interior. An illustrative lock assembly includes a locking bracket 7 and a spring 8 that both pivot about a dowel 9. A mounting screw 17 and sleeve 11 can illustratively be attached to housing 6 to provide a stop for locking bracket 7. An illustrative embodiment of locking bracket 7 includes a lock arm and a stop arm configured to assist in locking and releasing locating pin 2. A main cover 14 is attachable to housing 6 via fastener 16 in order to provide selective access to the locking mechanism and other structures. A set screw or stop 15 is illustratively disposed through the top of housing 6 and extends into the bore to position adjacent lock arm 50 (see, also, FIG. 3) of bracket 7. Illustratively, set screw 15 is adjustable to determine the amount of backup available to locating pin 2. A dowel 10 is engageable with a piston rod 33 and is disposed through a slot in drive rod 5 to move the same linearly via activation of cylinder 13, shown here as a pneumatic cylinder including a piston 35. Actuator 13 is attached to clamp assembly 1 illustratively via fastener 18 which attaches to mounting flange 12 which also receives housing 6. A bore disposed through mounting flange 12 allows piston rod 33 to be disposed therethrough and engage drive rod 5.

Figure 3:
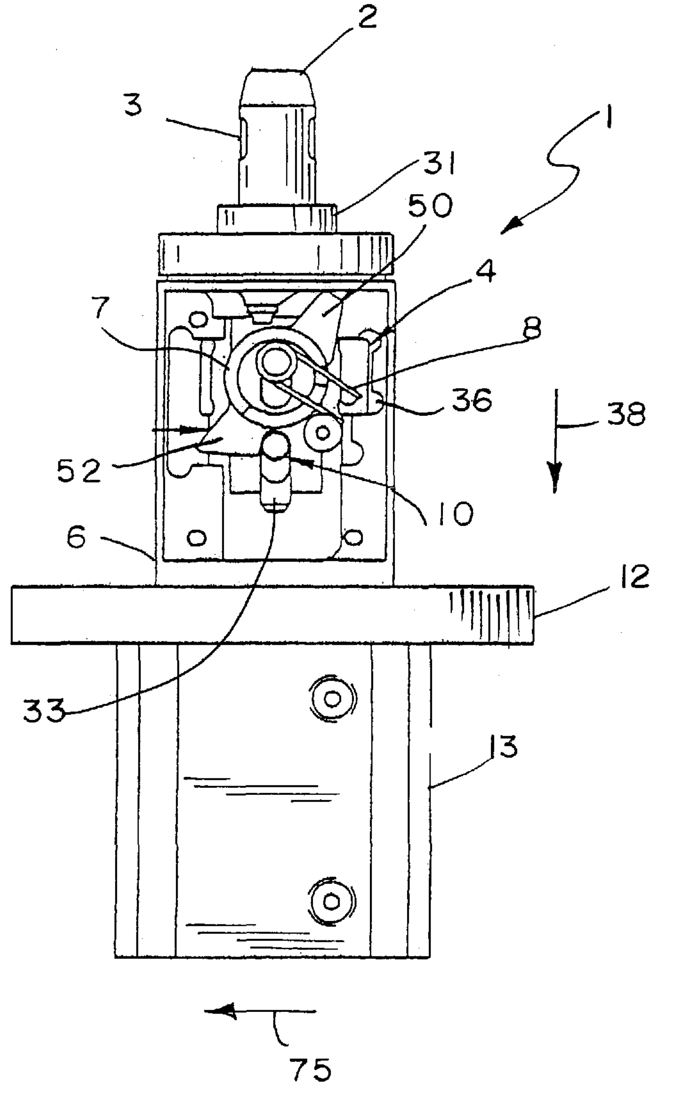
FIG. 3 is a cross-sectional side view of a locating pin clamp assembly.
Figure 4:
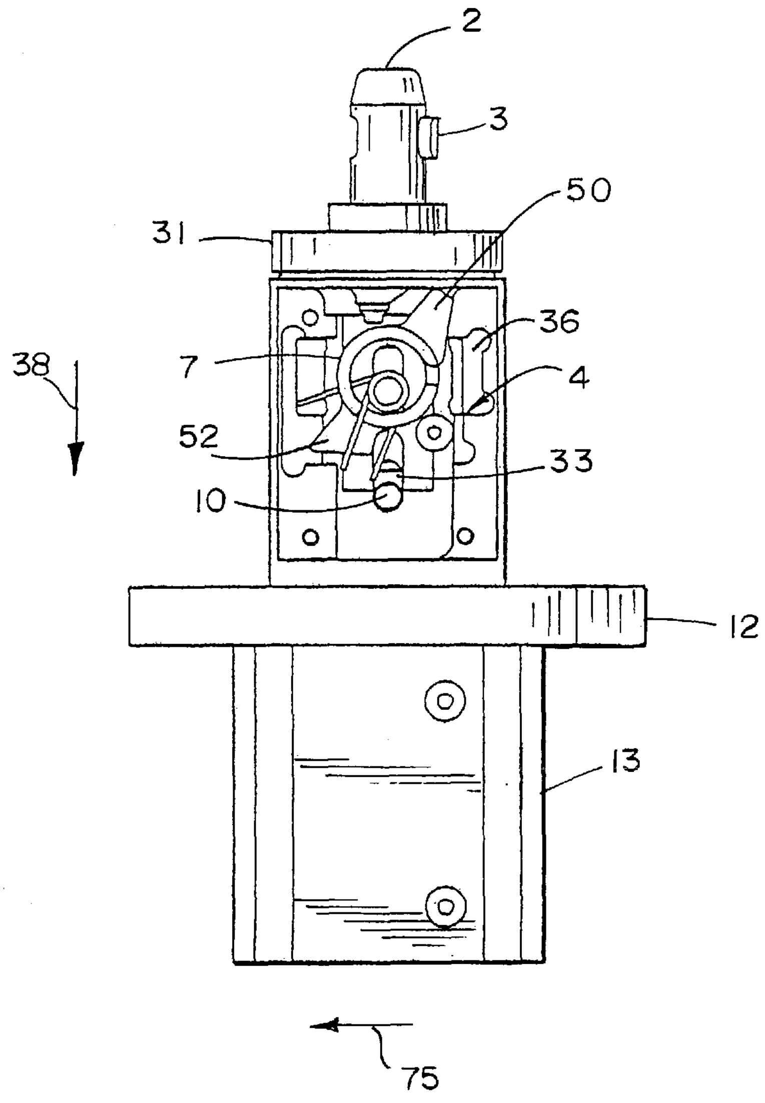
FIG. 4 is another cross-sectional side view of the locating pin clamp assembly of FIG. 3.
Figure 12B:
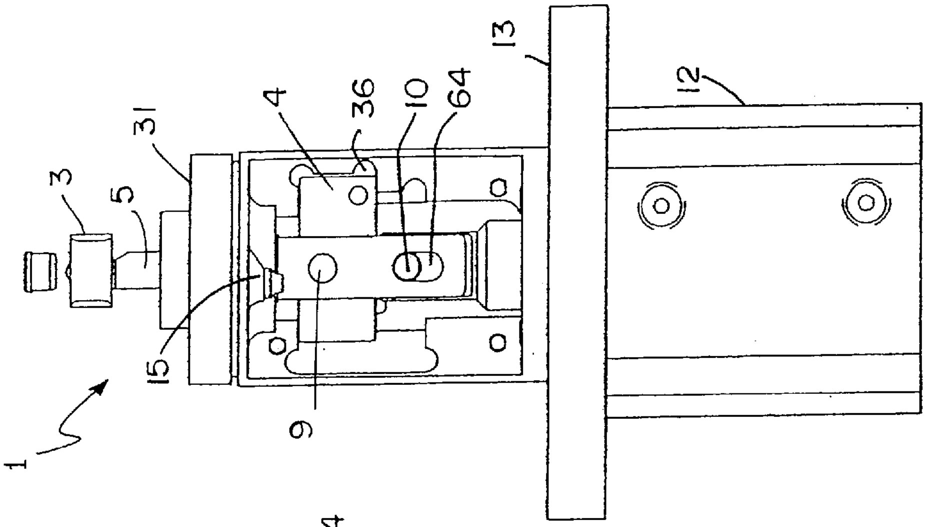
FIGS. 12*a* and *b* are sectional, isolated, and cross-sectional views of the locating pin clamp assembly taken along lines A-A of FIG. 11.
Figure 12A:
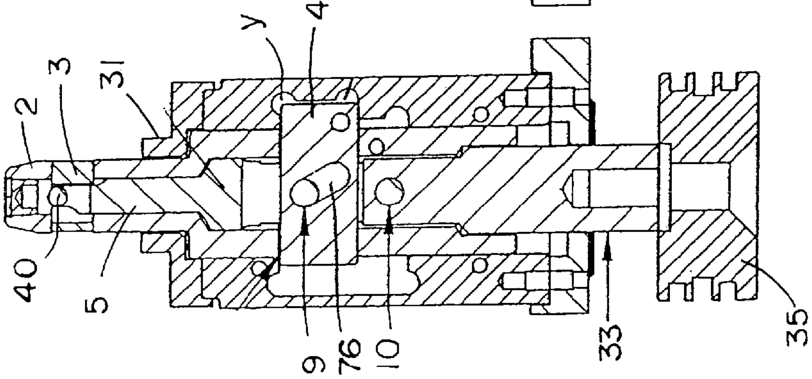

FIGS. 3-9 are cross-sectional side views that depict the process by which locating pin 2 and finger 3 are extended and retracted along with the operation of the locking mechanism. As shown in FIG. 3, locating pin 2 is located in the extended position and finger 3 is retracted. In the interior of housing 6, cam 4 is shifted in slot 36 and the lock assembly is located in the open position. When actuator 13 is activated to pull piston rod 33 downward in direction 38 toward the retracted position, as shown in FIG. 4, drive rod 5 is also drawn downward in direction 38 which moves cam 4 illustratively in direction 75, beginning its exit from slot 36. (See also FIG. 12*a*.) Because drive rod 5 is being drawn downward, the tongue or pin 40 that extends therefrom and engageable with slot 39 in finger 3, also moves from the upper position 42 in slot 39 to its lower position 44, as shown in FIGS. 10*a-d*. As shown in these figures, finger 3 moves from the retracted position (see FIG. 10*a*) to the extended position (see FIG. 10*b*). As particularly shown in FIG. 4, finger 3 is now extended, but locating pin 2 still does not retract. Cam 4, still being located in slot 36, prevents locating pin 2 from retracting.

Figure 5:
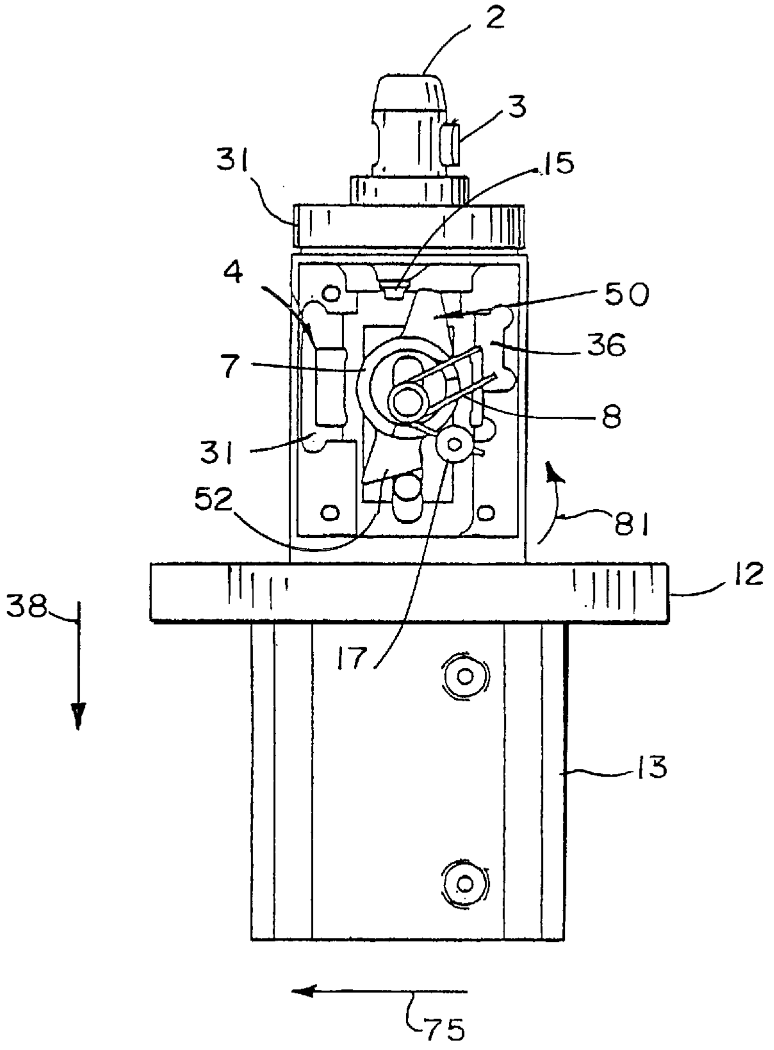
FIG. 5 is another cross-sectional side view of the locating pin clamp assembly of FIG. 4.

As shown in FIG. 5, once cam 4 is shifted far enough in direction 75 so it exits slot 36, the continued pulling of drive rod 5 in direction 38 by piston rod 33 (see, also, FIG. 12*a*) pulls on cam 4 which pulls it and locating pin 2 in direction 38 as well. This occurs until locating pin 2 and finger 3 reach the end of their stroke, illustratively when they engage a workpiece resting on part support 31.

Figure 6:
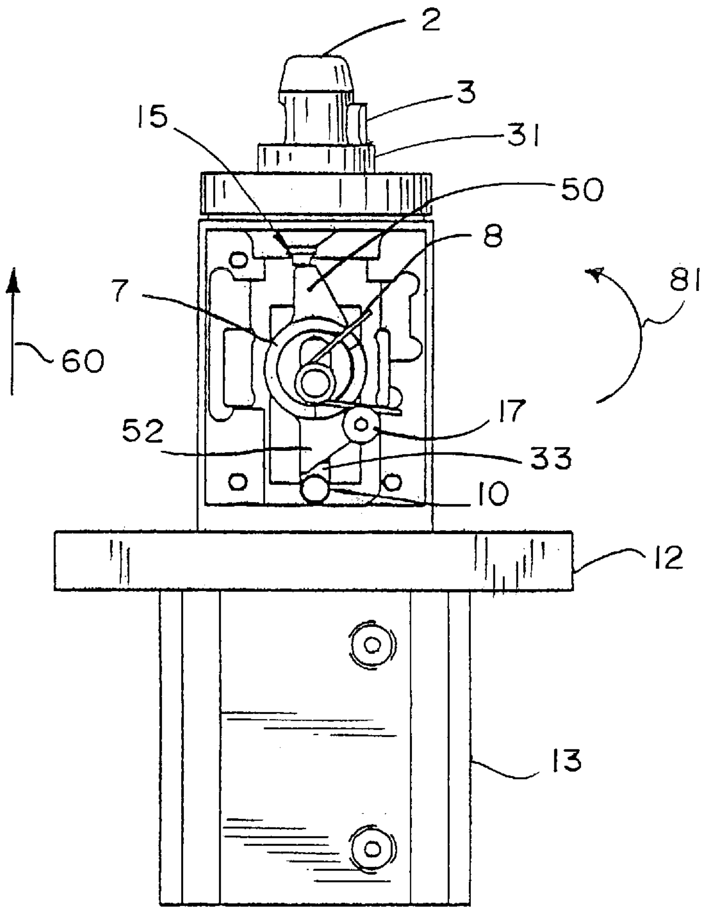
FIG. 6 is another cross-sectional side view of the locating pin clamp assembly of FIG. 5.

While this is occurring, an illustrative embodiment of pin clamp 1 includes a lock assembly which comprises a lock arm 50 and a stop arm 52 both on locking bracket 7. As shown in FIG. 3, the lock assembly is in the open position meaning that lock arm 50 does not prevent movement of locating pin 2. As locating pin 2 retracts, as shown in FIG. 5, the bias of spring 8 causes bracket 7 to rotate, in this case in a counter-clockwise direction 81. In so doing, when locating pin 2 is retracted to its desired position, lock arm 50 is located adjacent set screw or stop 15. Also, stop arm 52 engages sleeve 11 (see FIG. 2) that surrounds fastener 17 to prevent further movement of bracket 7. As shown in FIG. 6, bracket 7 located in this position employs stop arm 50 and lock arm 52 to prevent locating pin 2 from extending upward in direction 60. As can be seen, if this is attempted, lock arm 50 simply engages set screw 15 preventing extension of locating pin 2. It is appreciated that set screw 15 or other stop can be adjustable so that there may be some free movement of locating pin 2, if desired. Or, if locating pin 2 clamps onto parts of various thicknesses, set screw 15 can be adjusted to accommodate those thicknesses.

Figure 7:
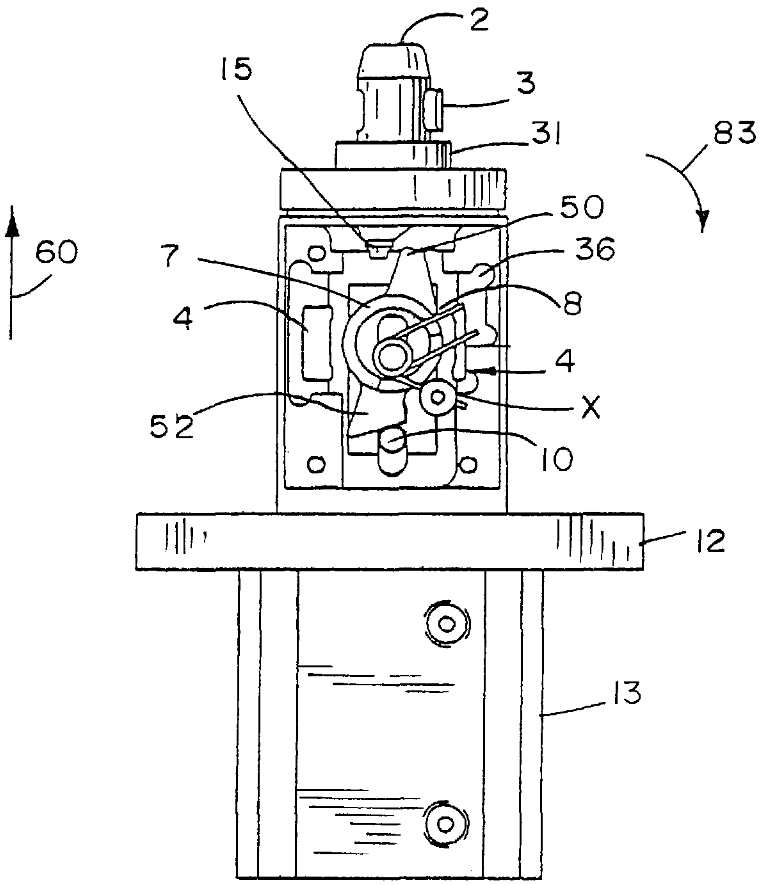
FIG. 7 is another cross-sectional side view of the locating pin clamp assembly of FIG. 6.
Figure 8:
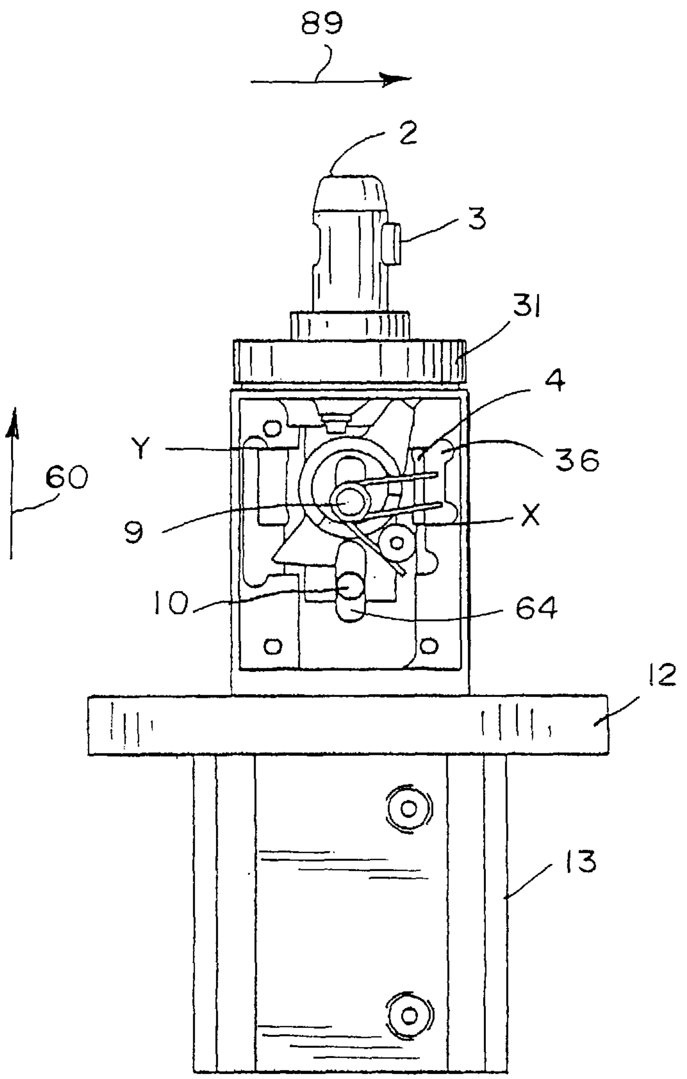
FIG. 8 is another cross-sectional side view of the locating pin clamp assembly of FIG. 7.
Figure 9:
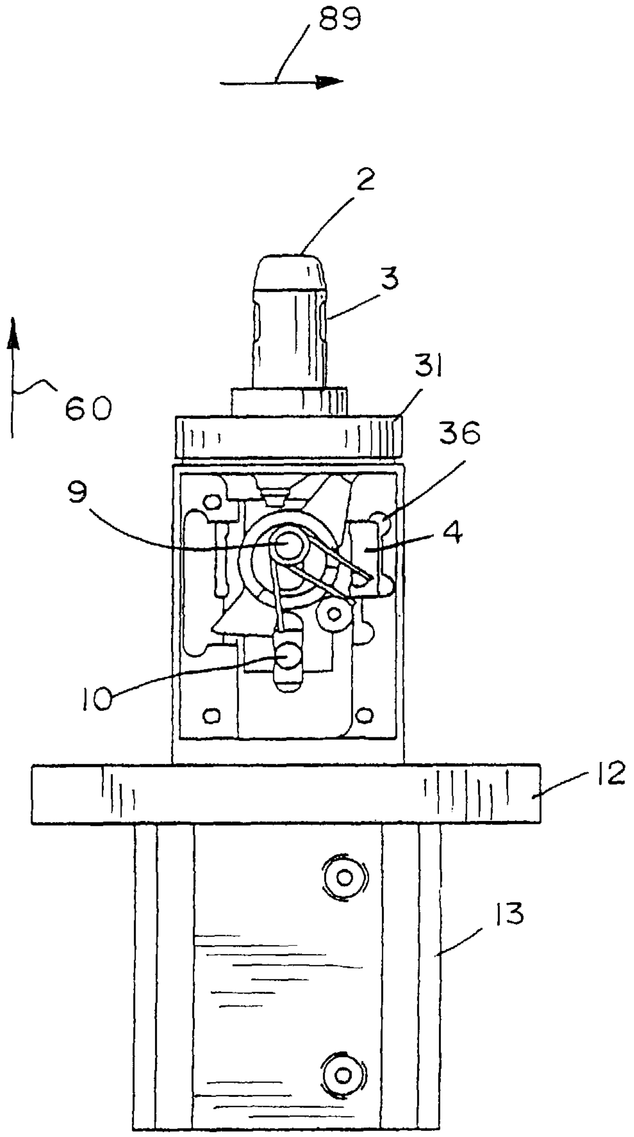
FIG. 9 is another cross-sectional side view of the locating pin clamp assembly of FIG. 8.
Figures 10A, 10B, 10C, 10D:
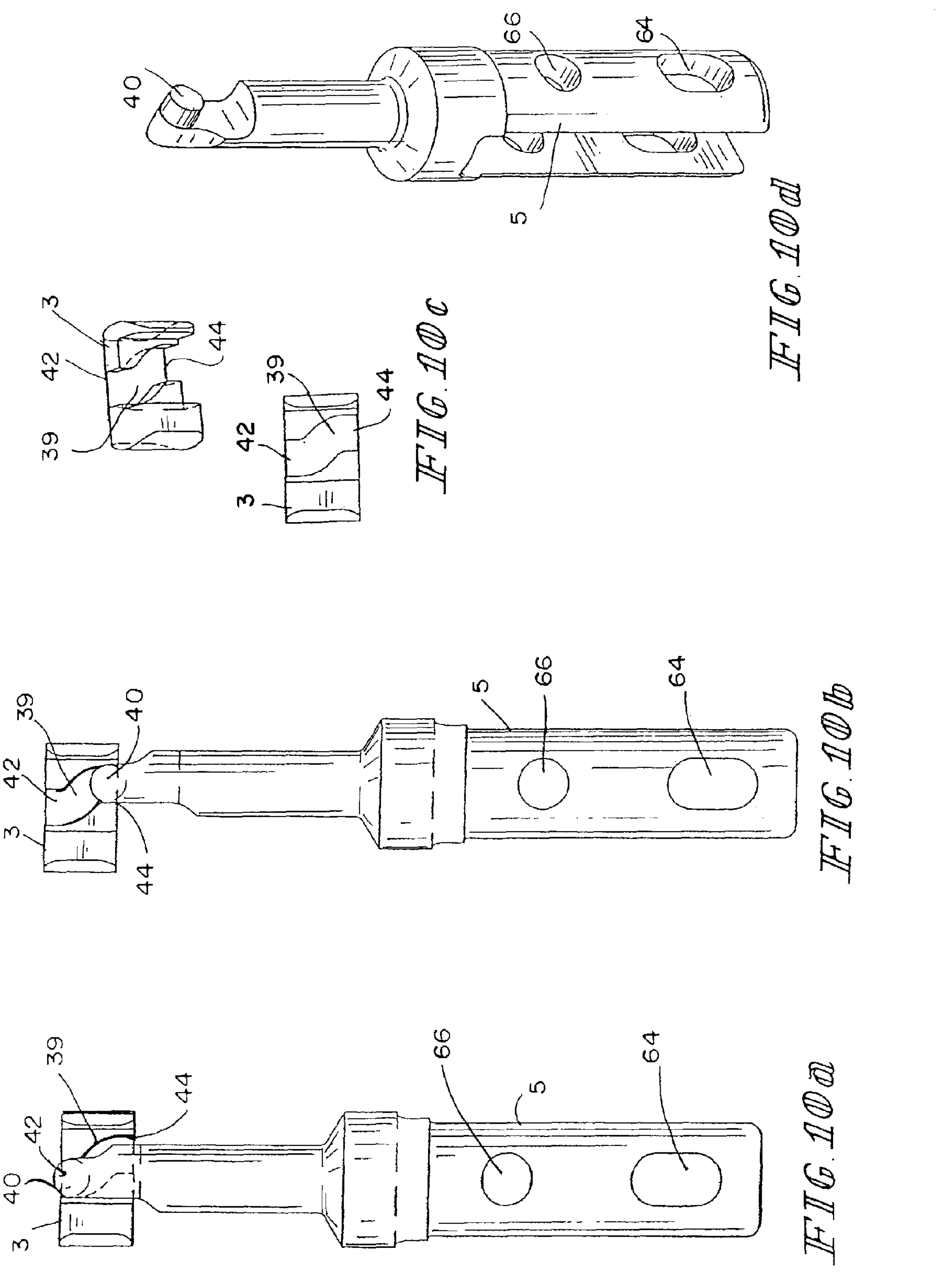
FIGS. 10*a-d* are various perspective views of a drive rod and finger, and the interaction between the same.
Figure 11:
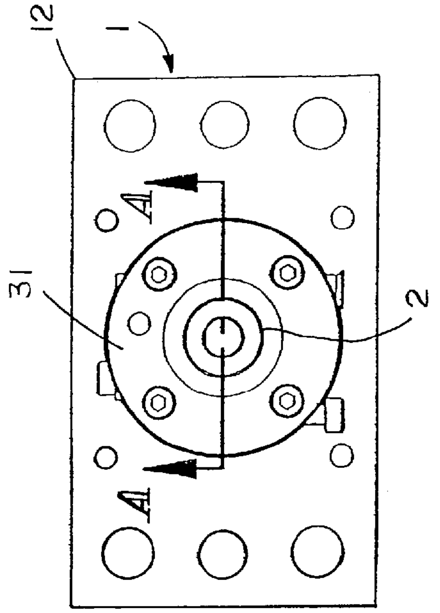
FIG. 11 is a top view of the locating pin clamp assembly.
Figure 14B:
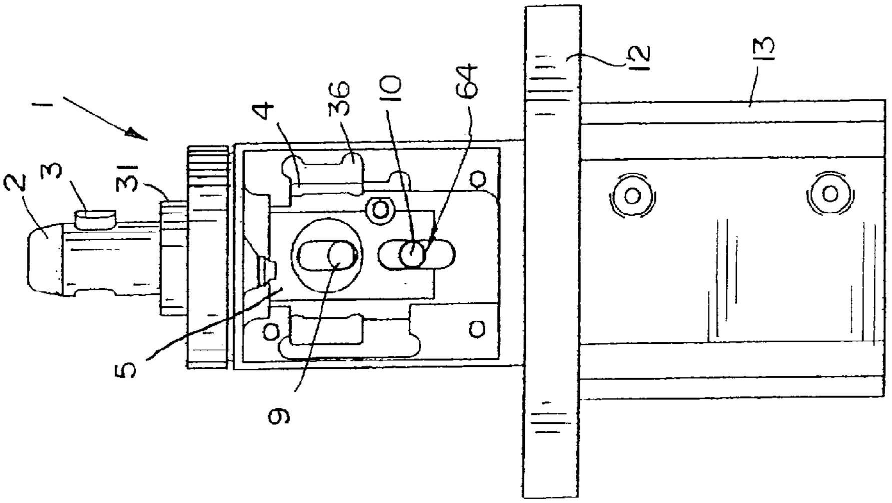
FIGS. 14*a* and *b* are sectional, isolated, and cross-sectional views of locating pin clamp assembly taken along lines A-A of FIG. 13.
Figure 14A:
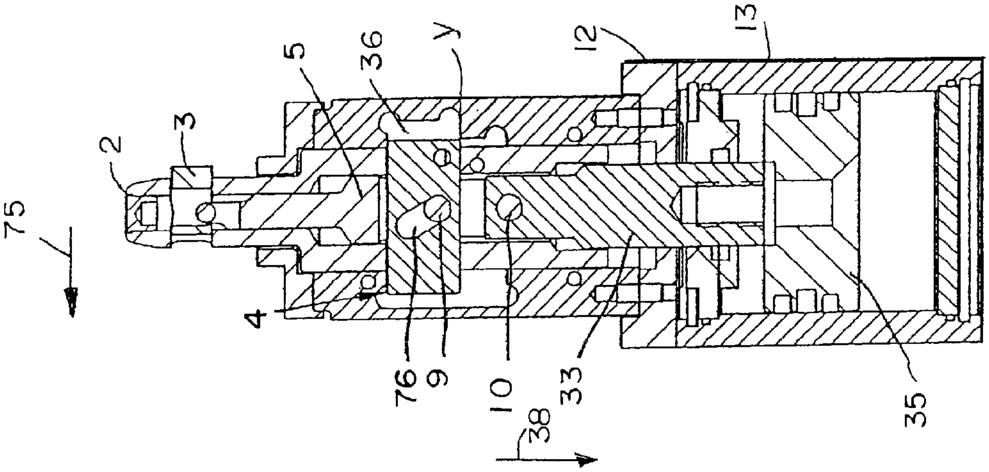
Figure 13:
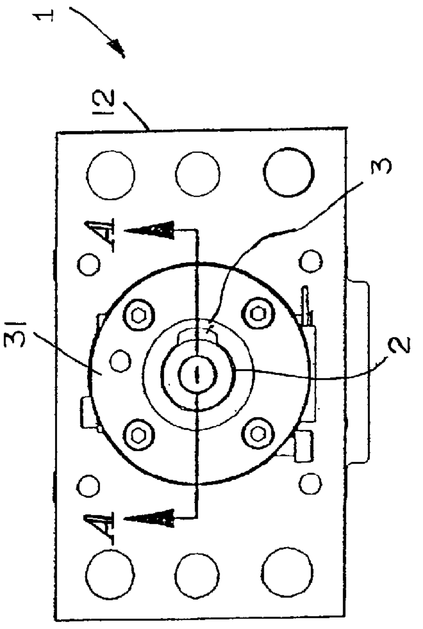
FIG. 13 is a top view of the locating pin clamp assembly.

The extension process of locating pin 2, as shown in FIGS. 7-9, includes activating actuator 13 to cause drive pin 33 (see, also, FIG. 12*a*) to begin extending upward in direction 60. It is appreciated that drive pin 10 is disposed in slot 64 disposed in drive rod 5 (see, also, FIG. 10) which allows movement of drive pin 10 prior to movement of drive rod 5. The consequence of this is that, as shown in FIG. 7, drive pin 10 pushes on stop arm 52 to rotate the same illustratively in a clockwise direction 83, moving lock arm 50 from set screw 15. As shown, this clockwise movement against the bias of spring 8 allows both drive rod 5 and locating pin 2 to move upward in direction 60, thereby extending the same. As also shown, cam 4 is held by a side wall in housing 6 and has not yet reached slot 36, and particularly surface X. This allows locating pin 2 to continue to extend. As further shown in FIG. 8, continued extension of locating pin 2 in direction 60 causes cam 4 to engage surfaces X and Y in slot 36. The engagement between the cam slot in cam 4 and drive rod 5 via pin 9 (disposed in hole 66 and drive rod 5 as shown in FIGS. 10*a*, *b* and *d*) pushes cam 4 illustratively in direction 89 and into slot 36. (See also FIGS. 11 and 12*a* and *b*.) This causes locating pin 2 to cease moving, since it is at the end of the stroke. After this movement, however, drive rod 5 still moves upward in direction 60 which causes finger 3 to retract into locating pin 2 by the opposite method described previously, and shown in FIGS. 10*a* and *b*. The view shown in FIG. 9 also depicts the end of the sequence.

The views shown in FIGS. 10*a* through *d* depict the interaction between drive rod 5 and finger 3. Slot 39 in finger 3 is illustratively an angled slot that receives pin 40 so that as drive rod 5 moves vertically, pin 40 extends or retracts finger 3 in locating pin 2. In this illustrative embodiment, moving pin 40 through slot 39 to upper position 42 retracts the slot, whereas moving pin 40 toward lower position 44 extends the finger. Drive rod 5 is attached to the clamp assembly 1 via pin 9 that is disposed through hole 66. Slot 64 receives pin 10, but has the elongated-slot shape so that piston rod 33 can move pin 10 independently of drive rod 5.

Figure 16B:
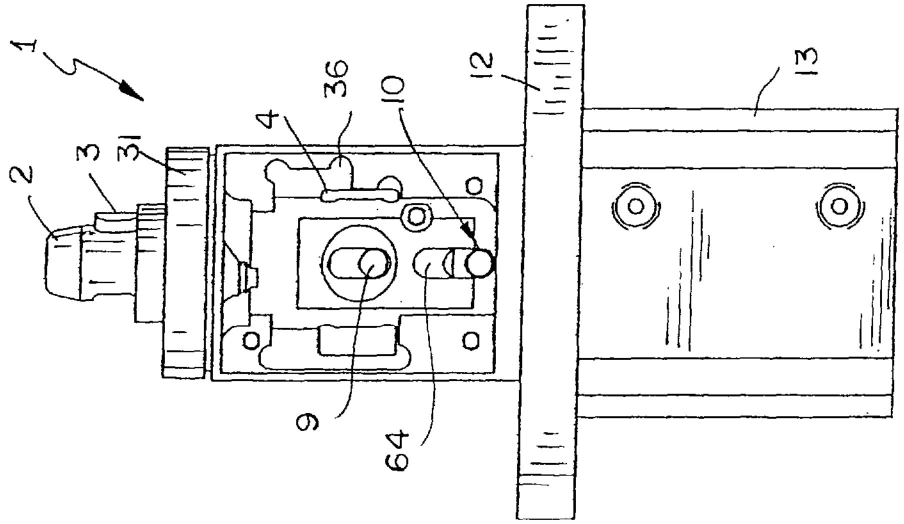
FIGS. 16*a* and *b* are sectional, isolated, and cross-sectional views of locating pin clamp assembly taken along lines A-A of FIG. 15.
Figure 16A:
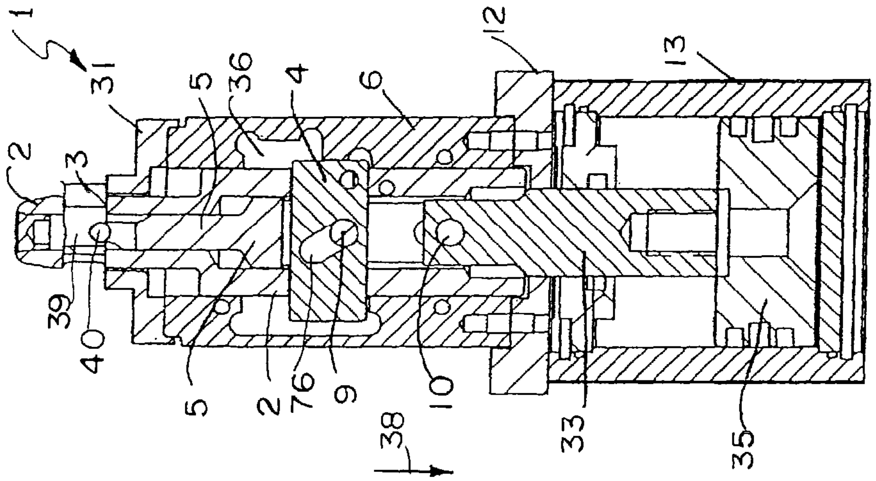
Figure 15:
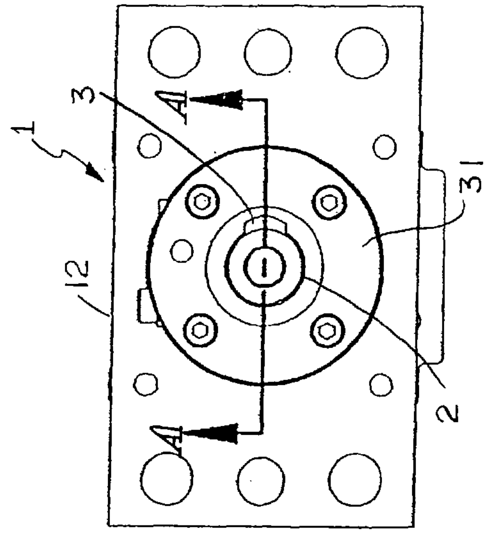
FIG. 15 is a top view of the locating pin clamp assembly.
Figure 18B:
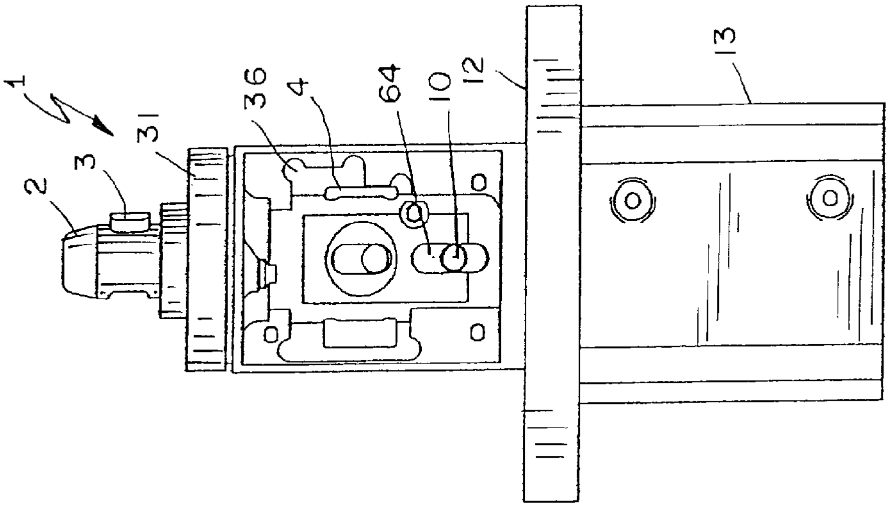
FIGS. 18*a* and *b* are sectional, isolated, and cross-sectional views of locating pin clamp assembly taken along lines A-A of FIG. 17.
Figure 18A:
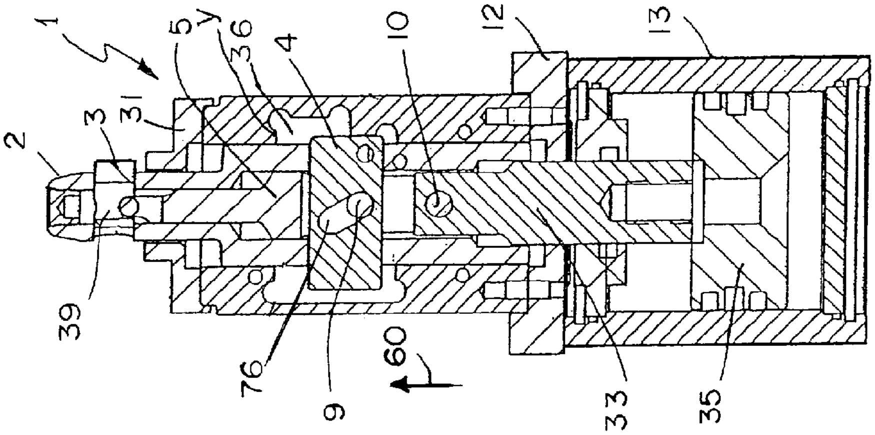
Figure 17:
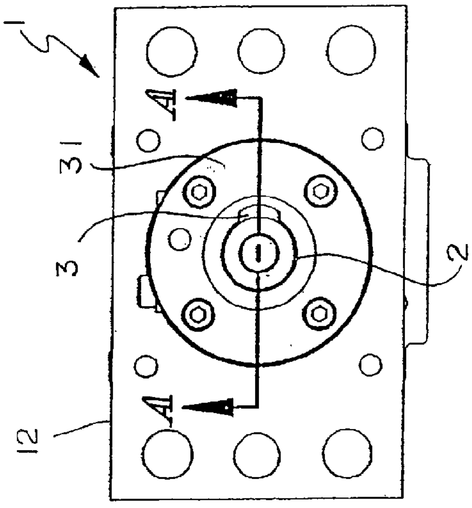
FIG. 17 is a top view of the locating pin clamp assembly.

FIGS. 11 through 18 are additional top and cross-sectional views similar to that shown in FIGS. 3 through 9 except the section is taken along lines A-A down the middle of the clamp. These views show more detail movement of piston rod 33, drive rod 5, cam 4 with cam slot 76, and locating pin 2. As shown in FIGS. 12*a* and *b*, piston rod 33 driving locating pin 2 to the extended position also drives cam 4 into slot 36. When piston rod 33 begins to retract in direction 38, as shown in FIGS. 14*a* and *b*, it pulls drive rod 5 downward in direction 38 as well which moves pin 9 through cam slot 76, as shown in FIG. 14*a*. This causes cam 4 to move in direction 75 out of slot 36. At the same time, this view shows finger 3 being extended from locating pin 2 because of the movement of drive rod 5. This view also shows how pin 10 which connects piston rod 33 to drive rod 5 has room to move without necessarily moving locating pin 5. When pin 10 engages the bottom of the slot 64 of drive rod 5, it is pulled downward in direction 38. (See, also, FIGS. 10*a* and *b*.) It is notable that this figure is comparable to FIG. 4 previously discussed. The view in FIG. 16 depicts how locating pin 2 retracts in direction 38, once cam 4 has cleared slot 36. Because cam 4 is coupled to both drive rod 5 and locating pin 2 via pin 9, as piston rod 33 moves drive rod 5 in direction 38, now it drives locating pin 2 in direction 38 as well. This view is comparable to FIG. 6, also previously discussed. FIG. 18 shows that when drive rod 33 moves in direction 60, dowel 10 is pushed to the top of slot 64 of drive rod 5. Cam 4 is moved as well, and is attempting to move toward slot 36, but is prevented from doing so because of the side of housing 6. The result is that locating pin 2 extends while finger 3 remains extended as well. It is not until cam 4 engages the top surface Y of slot 36 that extension of locating pin 2 is stopped, yet movement of drive rod 5 to retract the finger 3 continues. This view is comparable to FIG. 7.

Figure 19:
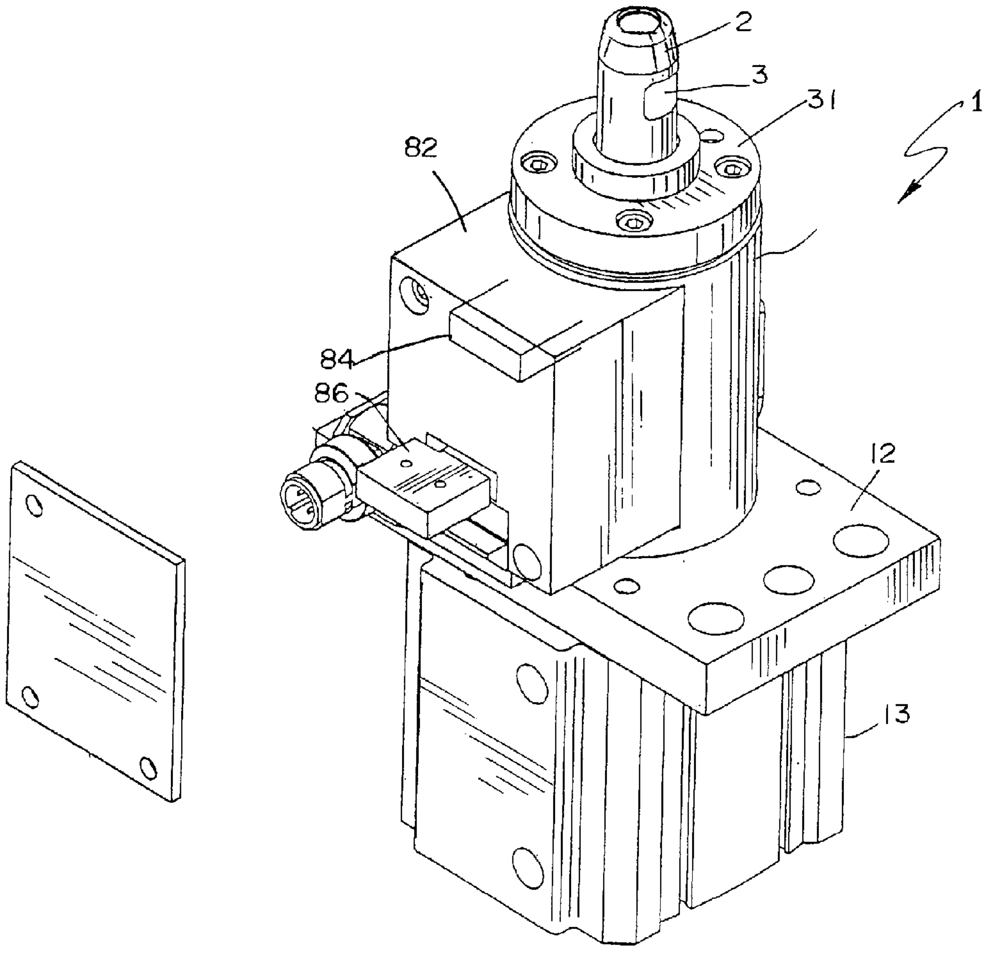
FIG. 19 is a perspective view of a locating pin clamp assembly with a sensor assembly attached thereto.

FIG. 19 is another illustrative embodiment of locating clamp 1 including a sensor assembly 82. As previously discussed, sensor 84 is configured to sense the position of the locking arm 50 and sensor 86 is configured to detect stop arm 52. By detecting the position of these arms, the sensor can relay to a user that the locating pin is in a clamped or unclamped position.

Although the present disclosure has been described with reference to particular means, materials, and embodiments, from the foregoing description one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A pin clamp assembly comprising:

a body;

a locating pin coupled to the body and movable between extended and retracted positions;

an actuator;

a drive rod movable relative to the locating pin;

a cam movable relative to the locating pin and the drive rod;

a finger coupled to the drive rod and movable between extended and fully retracted positions;

wherein actuation of the actuator causes the drive rod to move which extends the finger without moving the locating pin; and wherein continued retraction of the drive rod after the finger has extended causes the cam to move out from a slot in the body to allow the locating pin to retract.

2. The pin clamp assembly of claim 1, wherein the drive rod is linearly movable relative to the locating pin.

3. The pin clamp assembly of claim 1, further comprising a pin disposed in the cam slot located in the cam and through the drive rod.

4. The pin clamp assembly of claim 1, wherein the cam is located in the locating pin and in the body.

5. The pin clamp assembly of claim 1, wherein the body includes a slot configured to receive the cam to selectively prevent the locating pin from moving when the finger is extending.

6. A pin clamp assembly comprising:

a body;

a locating pin movably coupled to the body between extended and retracted positions;

an actuator;

a piston rod attached to the actuator and linearly movable upon activation of the actuator;

a cam located in the locating pin and the body and having a cam slot disposed therein;

a drive rod located in and movable relative to the locating pin;

a pin disposed in the cam slot and through the drive rod;

a finger coupled to the drive rod and movable between extended and fully retracted positions;

wherein actuation of the actuator causes the drive rod and cam to move which extends the finger without moving the locating pin;

wherein a slot is located in the body configured to receive the cam to selectively prevent the locating pin from moving when the finger is moving to the extended position;

wherein as the piston rod retracts, it pulls on the drive rod coupled to the finger causing the finger to extend from the locating pin; and wherein continued retraction of the drive rod after the finger has extended causes the cam to move out from the slot in the body to allow the locating pin to retract.

7. A pin clamp assembly comprising:

a body;

a locating pin movably coupled to the body between extended and retracted positions;

an actuator;

a drive rod movable relative to the locating pin;

a cam movable relative to the locating pin and the drive rod;

a finger coupled to the drive rod and movable between extended and fully retracted positions;

wherein actuation of the actuator causes the drive rod to move which extends the finger without moving the locating pin;

wherein continued retraction of the drive rod after the finger has extended causes the cam to move out from a slot in the body to allow the locating pin to retract; and a locking bracket assembly which comprises a pivoting locking arm that is biased to cause rotation of that arm as the locating pin retracts, the locking arm engages a first stop member to limit the amount of rotation of the locking arm, and a second stop member engages the locking arm limiting movement of the locating pin.

8. The pin clamp assembly of claim 7, wherein the second stop member is a set screw that allows limited movement of the locating pin.

9. The pin clamp assembly of claim 8, wherein the second set screw allows or prohibits extension of the locating pin.

10. The pin clamp assembly of claim 9, further comprising a release member that engages a portion of the locking bracket assembly to release it from prohibiting movement of the locating pin.

11. The pin clamp assembly of claim 10, wherein the release member is attached to the piston rod.

12. The pin clamp assembly of claim 11, wherein the release member is disposed through a slot in the drive rod to allow movement of the release member prior to engagement of the drive rod.

13. The pin clamp assembly of claim 12, wherein after the piston rod and release member move the locking assembly, the drive rod and locating pin extend.

14. The pin clamp assembly of claim 13, wherein the locking arm is biased by a spring.

15. The pin clamp assembly of claim 10, wherein to extend the locating pin the release member moves and engages the locking bracket against the bias which rotates the locking arm away from the second stop member.

16. The pin clamp assembly of claim 7, further comprising a sensor assembly comprising a sensor attached to the pin clamp assembly in a position proximate to the ram which includes a sensor target.

17. A pin clamp assembly comprising:

a finger that selectively extends from a locating pin independently from any movement of the locating pin, and wherein the locating pin retracts only after the finger is extended.

18. A pin clamp assembly comprising:

a body;

a locating pin coupled to the body and movable between extended and retracted positions;

an actuator;

a drive rod movable relative to the locating pin;

a finger coupled to the drive rod and movable between extended and fully retracted positions;

wherein actuation of the actuator causes the drive rod to move which extends the finger without moving the locating pin; and wherein after extending the finger the locating pin is retractable.

* * * * *